ELECTRICAL ANALOGUE DEVICE

Filed Sept. 30, 1948

Inventor
GEOFFREY HUSON STEPHENSON
By J. O. Ollier,
Attorney

Patented Sept. 11, 1951 2,567,532

UNITED STATES PATENT OFFICE 2,567,532

ELECTRICAL ANALOGUE DEVICE

Geoffrey Huson Stephenson, London, England, assignor to Electric & Musical Industries Limited, Hayes, England, a British company Application September 30, 1948, Serial No. 51,970
In Great Britain October 7, 1947

7 Claims. (Cl. 235—61)

Figure 1:
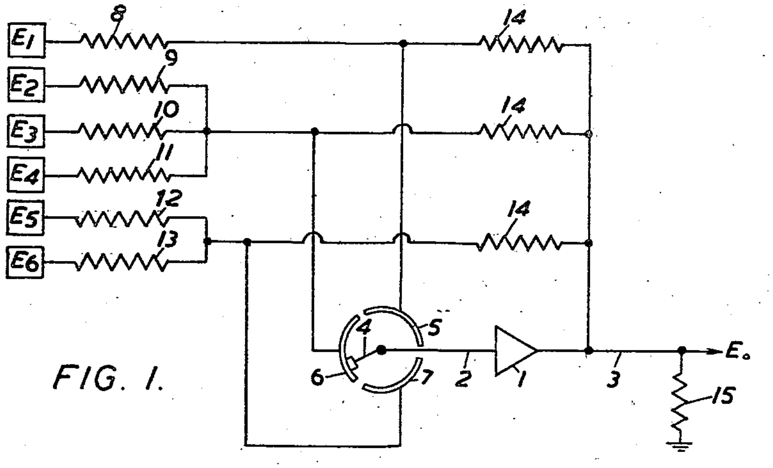

This invention relates to arrangements for switching voltages and relates especially but not exclusively to such arrangements intended for use in electrical analogue computing apparatus.

In electrical analogue computing it is sometimes required to switch different combinations of a plurality of voltages in a predetermined sequence across a low impedance load so that in each case a voltage is set up across said load which effectively represents the sum of the selected combination of voltages. It has been proposed to effect the required switching by utilizing, for each combination which it is required to select, a separate high gain amplifier employing negative feedback whereby the amplifier operates with a low input impedance, applying each voltage of the corresponding combination to the input electrode of the amplifier via a series feeding resistance, and by providing a switching device which can be operated to connect said load in the desired sequence to the output electrodes of the various amplifiers.

However, such a proposal requires as many amplifiers as there are voltage combinations and if the number of combinations is large the multiplicity of amplifiers can constitute a major disadvantage. In addition if a "break-before-make" type of switch is provided, whereby when the switch is operated the load is disconnected from one amplifier before it is connected to the next, discontinuity results which cannot usually be tolerated. On the other hand if a "make-before-break" type of switch is provided, whereby the load is connected to the output of one amplifier before being disconnected from the output of the preceding amplifier then it is found that at the instant when the load is connected simultaneously to two amplifiers the voltage set up across the load represents the summation of the voltage combination which has the more positive instantaneous value, which is also undesirable.

The object of the present invention is to provide an improved arrangement whereby a plurality of voltages can be switched successively across a load, with a view to avoiding or reducing the above described disadvantages.

According to the present invention there is provided an arrangement whereby a plurality of voltages can be switched successively across a load, the arrangement comprising a thermionic valve amplifier employing negative feedback whereby said amplifier operates with a low input impedance and having said load coupled to the output electrode of said amplifier, a switch having a plurality of input contacts which can be coupled respectively to sources of said voltages and an output contact coupled to the input electrode of said amplifier, whereby said switch can be operated to couple said input contacts successively to said input electrode, and wherein said switch is such that on operation each input contact is switched into conductive connection with said output contact before the preceding input contact is switched from conductive connection therewith, and a separate negative feedback path is provided from said output electrode to each of said input contacts.

In most applications of the invention said feedback paths will be effectively electrically identical whereby when said output contact is simultaneously in conductive connection with two input contacts the voltage set up across said load effectively represents the mean of the voltages applied to said two input contacts.

Figure 2:
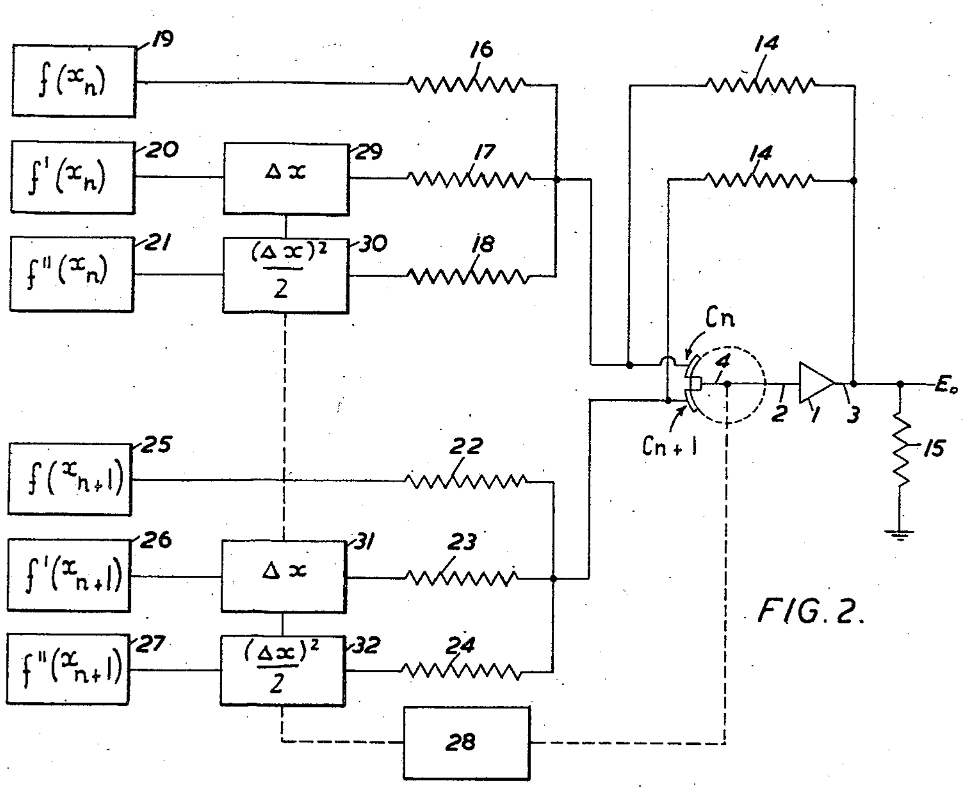

In order that the invention may be clearly understood and readily carried into effect, it will now be more fully described with reference to the accompanying drawing, in which:

Figure 1 illustrates diagrammatically and partly in block form an arrangement according to one example of the invention, and Figure 2 illustrates one application of the arrangement shown in Figure 1.

Referring to the drawing, the arrangement illustrated in Figure 1 is adapted to switch three voltages in sequence across a low impedance 15 but it will be understood that in practice any desired number of voltages can be switched by suitably modifying the arrangement. The arrangement comprises a high gain thermionic valve amplifier of any suitable construction indicated in block form at 1, having its input electrode (not shown) coupled to the input circuit of the arrangement by a conductor 2, and having its output electrode coupled to the output load 15 by a conductor 3. The arrangement also comprises a switch of the "make-before-break" type, which may also be of any suitable construction and is diagrammatically shown in the drawing as comprising a rotatable contact 4 connected to the input conductor 2, and fixed segmental contacts 5, 6 and 7 with which the contact 4 engages sequentially when it is rotated. The contact 4 is such that before breaking conductive contact with any one of the segmental contacts it makes conductive contact with the next segmental contact in the sequence. The contact 5 of the switch is connected via a feeding resistance 8, to a source of voltage $E_1$, the contact 6 is connected in parallel to three voltage sources $E_2$, $E_3$ and $E_4$ via feeding resistances 9, 10 and 11, while the contact 7 is connected in parallel to two voltage sources $E_5$ and $E_6$ via feeding resistances 12 and 13. A separate negative feedback path is provided from the output circuit of the amplifier 1 to each of the contacts 5, 6, 7, in each case by means of resistances 14, the resistances 14 being of equal values. Negative feedback is therefore applied to the input electrode of the amplifier through one or other of the contacts 5, 6 or 7 irrespective of the position of the movable contact 4, and moreover at the instants when the contact 4 engages two of the contacts 5, 6 and 7 negative feedback is provided to the input electrode of the amplifier via two of the resistances 14. The negative feedback causes the amplifier to operate with a low input impedance, and when the contact 4 engages the contact 5 the voltage $E_0$ set up across the load impedance 15 is proportional to $E_1$, when the contact 4 engages the contact 6 the voltage $E_0$ is proportional to $E_2+E_3+E_4$, whereas when the contact 7 the voltage $E_0$ is proportional to $E_5+E_6$. When the contact simultaneously engages the two contacts 5 and 6, by reason of the fact that negative feedback is now provided via two resistances 14, the voltage $E_0$ is proportional to $$\frac{E_1+E_2+E_3+E_4}{2}$$

whereas when the contact 4 simultaneously engages the two segments 6 and 7 the voltage $E_0$ is proportional to $$\frac{E_2+E_3+E_4+E_5+E_6}{2}$$

Figure 2 illustrates an application of the arrangement of Figure 1 to apparatus for computing approximate values of a function of one independent variable, say $f(x)$, utilizing the Taylor expansion for the function. Corresponding parts in Figures 1 and 2 bear the same reference numerals, but the switch in Figure 2 has a number say 100 of fixed segmental contacts $c_1, c_2 \ldots c_r$, only two denoted by the reference $c_n$ and $c_{n+1}$ being however shown. Each of the contacts is connected to three sources of voltage, the first voltage being proportional to the value of $f(x)$ for a particular value of $x$, the second voltage being proportional to $f'(x)$ i. e., the first derivative of $f(x)$ for the same value of $x$, and the third voltage being proportional to $f''(x)$ for same value of $x$, the values $x_1, x_2 \ldots x_r$ being respectively allotted to the contacts $c_1, c_2 \ldots c_r$.

The values of $x_1, x_2 \ldots x_r$ are moreover such that the difference between any two successive values is a constant, $k$ say. Thus, as shown in Figure 2, the contact $c_n$ is connected by feeding resistances 16, 17 and 18 to three voltage sources 19, 20 and 21 in which are stored voltages proportional to $f(x_n)$, $f'(x_n)$ and $f''(x_n)$ respectively. Similarly the contact $c_{n+1}$ is connected by feeding resistances 22, 23 and 24 to three voltage sources 25, 26 and 27 in which are stored voltages proportional to $f(x_{n+1})$, $f'(x_{n+1})$ and $f''(x_{n+1})$ and so on for the remaining fixed contacts. Each voltage source may be for example a potentiometer or an auto-transformer energized from a reference voltage and having the tap thereon located so that the voltage set up at the tap is representative of the desired particular value of $f(x)$, $f'(x)$ or $f''(x)$ as the case may be. The rotatable contact 4 of the switch is arranged to be driven by suitable means indicated in block form at 28 whereby the movable contact 4 on operation of the device is rotated continuously in such a direction that it engages the contacts $c_1, c_2 \ldots c_r$, in succession, and potentiometers 29, 30, 31 and 32, the taps on which are also driven by the aforesaid means 28 are interposed as shown between the sources 20, 21, 26 and 27 and the feeding resistances 17, 18, 23 and 24. The potentiometers 29 and 31 are linear law potentiometers of any suitable construction each arranged to multiply the voltage of the respective source 20 or 26 by an incremental factor $\Delta x$ and the potentiometers 30 and 32 are square law potentiometers each arranged to multiply the voltage of the respective source 21 or 27 by the factor $(\Delta x)^2/2$, the voltage to be multiplied being applied in each case across the whole of the respective potentiometer so that the desired product is set up at the tap thereon. The taps on potentiometers 27 to 32 are driven synchronously with the contact 4 so that in the time interval when the contact 4 is in engagement with the contact $c_n$ the value of $\Delta x$ for the potentiometers 29 and 30 varies uniformly from $-k/2$ to $+k/2$ and in the time interval when the contact 4 is in engagement with $c_{n+1}$ the value of $\Delta x$ for the potentiometers 31 and 32 varies uniformly over the same range of values. It will of course be appreciated that two potentiometers are provided for each of the contacts $c_1, c_2 \ldots c_r$, driven in a corresponding manner to that described for the case of the contacts $c_n$ and $c_{n+1}$.

Therefore, in the time interval when the contact 4 is in engagement with the contact $c_n$, for example, the voltage $E_0$ set up across the load resistance 15 represents $$f(x_n)+\Delta x f'(x_n)+(\Delta x)^2/2 f''(x_n)$$

and this equals the first three terms of the Taylor expansion for $f(x)$ for $x=(x_n+\Delta x)$. Therefore in said last-mentioned time interval the voltage $E_0$ varies uniformly from a value representing approximately $f(x_n-k/2)$ to a value representing approximately $f(x_n+k/2)$, and similarly in the time interval when the contact 4 is in engagement with the contact $c_n$, the voltage $E_0$ varies uniformly from a value representing approximately $f(x_{n+1}-k/2)$ to a value representing approximately $f(x_{n+1}+k/2)$. At the instant when the contact 4 engages both the contacts $c_n$ and $c_{n+1}$ the voltage $E_0$ represents $$\frac{f(x_n+k/2)+f(x_{n+1}-k/2)}{2}$$

that is the voltage $E_0$ is the mean of two nominally equal voltages so that effectively no discontinuity occurs in $E_0$ as the contact 4 rotates and errors in the value of $E_0$ will tend to be reduced. From the foregoing description of the operation of the apparatus in relation to the contacts $c_n$ and $c_{n+1}$ it will be understood that as the contact 4 engages the contacts $c_1, c_2 \ldots c_r$ sequentially the voltage $E_0$ will vary uniformly through all the values which $f(x)$ takes for values of $x$ in the range from $x_1-k/2$ to $x_r+k/2$.

The arrangement of Figure 2 can be readily applied to evaluating functions of more than one variable, the number of voltage sources connected to each of the switch contacts being then appropriately increased. The number of voltage sources connected to each contact can also be varied in dependence upon the accuracy required in evaluating the function.

What I claim is:

1. Electrical analogue computing apparatus for computing approximate values of an arbitrary function (say $f(x)$) of an independent variable (say $x$), comprising a thermionic valve amplifier having an input circuit and an output circuit, a plurality of equispaced contacts corresponding respectively to successive particular values of $x$ separated from each other by the same interval $\Delta x$, a make-before-break selector member for individually switching said contacts to the input circuit of said amplifier, whereby said selector member maintains engagement with each of said contacts through a small range of displacement representative of the interval $\Delta x$ and switches each contact to said input circuit before the previous contact is switched therefrom, means for feeding to each contact a current representative of the value of $f(x)$ at the particular value of $x$ corresponding to the contact, means for feeding to each contact, and in parallel with said last-mentioned current, a current representative of the product of a coefficient and the value of the first derivative of $f(x)$ at the corresponding particular value of $x$, means operable concomitantly with said selector member to cause said coefficient to vary between the values $-\Delta x/2$ and $+\Delta x/2$ as said selector member is displaced through the range in which it remains in engagement with each contact, and a separate feedback path from said output circuit to each of said contacts to cause said amplifier to operate as a current amplifier having a low input impedance compared with the impedance presented to said amplifier by said feeding means.

2. An arrangement for selecting different electrical signals, comprising a thermionic valve amplifier having an input circuit and an output circuit, a plurality of input points, one for each signal, means for feeding to each input point a current representative of the respective signal, make-before-break means for individually switching said input points to the input circuit of said amplifier, whereby on switching from one input point to the next the latter point is switched to said input circuit before the previous point is switched therefrom, and a separate negative feedback path from the output circuit of said amplifier to each input point, whereby said feedback paths cause said amplifier to operate with a low input impedance compared with the impedance presented to said amplifier by said feeding means, and whereby negative feedback is provided by two feedback paths to reduce correspondingly the gain of the amplifier when two input points are simultaneously switched to said input circuit.

3. An arrangement for selecting different electrical signals, comprising a thermionic valve amplifier having an input circuit and an output circuit, a plurality of input points, one for each signal, means for feeding to each input point a current representative of the respective signal, make-before-break means for individually switching said input points to the input circuit of said amplifier, whereby on switching from one input point to the next the latter point is switched to said input circuit before the previous point is switched therefrom, and a separate negative feedback path from the output circuit of said amplifier to each input point, said feedback paths being effectively electrically identical, whereby said feedback paths cause said amplifier to operate with a low input impedance compared with the impedance presented to said amplifier by said feeding means, and whereby negative feedback is provided by two feedback paths to cause the output of said amplifier to represent the arithmetic mean of the respective signals when two input points are simultaneously switched to said input circuit.

4. An arrangement for selecting different electrical signals, comprising a thermionic valve amplifier having an input circuit and an output circuit, a make-before-break selector switch comprising a plurality of fixed contacts, one for each signal, and a make-before-break contact movable to selectively engage said fixed contacts and connected to the input circuit of said amplifier for individually switching said fixed contacts to said input circuit, whereby on switching from one fixed contact to the next the latter fixed contact is switched to the input circuit before the previous fixed contact is switched therefrom, means for feeding to each fixed contact a current representative of the respective signal, and a separate negative feedback path from the output circuit of said amplifier to each fixed contact to cause said amplifier to operate with a low input impedance compared with the impedance presented to said amplifier by said feeding means, whereby negative feedback is provided by two feedback paths to reduce correspondingly the gain of the amplifier when two fixed contacts are simultaneously switched to said input circuit.

5. An arrangement for selecting different groups of electrical signals and for forming the sum of the signals in a selected group, comprising a thermionic valve amplifier having an input circuit and an output circuit, a plurality of input points, one for each group, means for feeding in parallel to each input point currents respresentative of the signals in the respective group, make-before-break means for individually switching said input points to the input circuit of said amplifier, whereby on switching from one input point to the next the latter point is switched to said input circuit before the previous point is switched therefrom, and a separate negative feedback path from the output circuit of said amplifier to each input point to cause said amplifier to operate with a low input impedance compared with the impedance presented to the amplifier by said feeding means, whereby negative feedback is provided by the two corresponding feedback paths when two input points are simultaneously switched to said input circuit.

6. An arrangement for selecting different groups of electrical signals and for forming the sum of the signals in a selected group, comprising a thermionic valve amplifier having an input circuit and an output circuit, a make-before-break selector switch having a plurality of fixed contacts, one for each group, and a make-before-break contact movable to selectively engage said fixed contacts and connected to the input circuit of said amplifier for individually switching said fixed contacts to said input circuit, whereby on switching from one fixed contact to the next the latter fixed contact is switched to said input circuit before the previous fixed contact is switched therefrom, means for feeding in parallel to each input contact currents representative of the signals in the respective group, and a separate negative feedback path from the output circuit of said amplifier to each input contact, whereby said amplifier operates with a low input impedance compared with the impedance presented to the amplifier by said feeding means, and whereby negative feedback is provided by the two corresponding feedback paths when two fixed contacts are simultaneously switched to said input circuit.

7. An arrangement according to claim 6, said negative feedback paths being effectively electrically identical, whereby the output of said amplifier represents the arithmetic sums of the sources of the respective groups when two fixed contacts are simultaneously switched to said input circuit.

GEOFFREY HUSON STEPHENSON.

REFERENCES CITED

The following references are of record in the file of this patent:

UNITED STATES PATENTS

| Number | Name | Date |
|---|---|---|
| 2,283,951 | Ripley | May 26, 1942 |
| 2,401,779 | Swartzel | June 11, 1946 |
| 2,466,803 | Giffen et al. | Apr. 12, 1949 |
| 2,471,252 | Toulon | May 24, 1949 |
| 2,490,727 | Carpentier | Dec. 6, 1949 |